(No Model.)
M. W. NEWTON.
HYDROSTATIC SCALE.
No. 473,772. Patented Apr. 26, 1892.
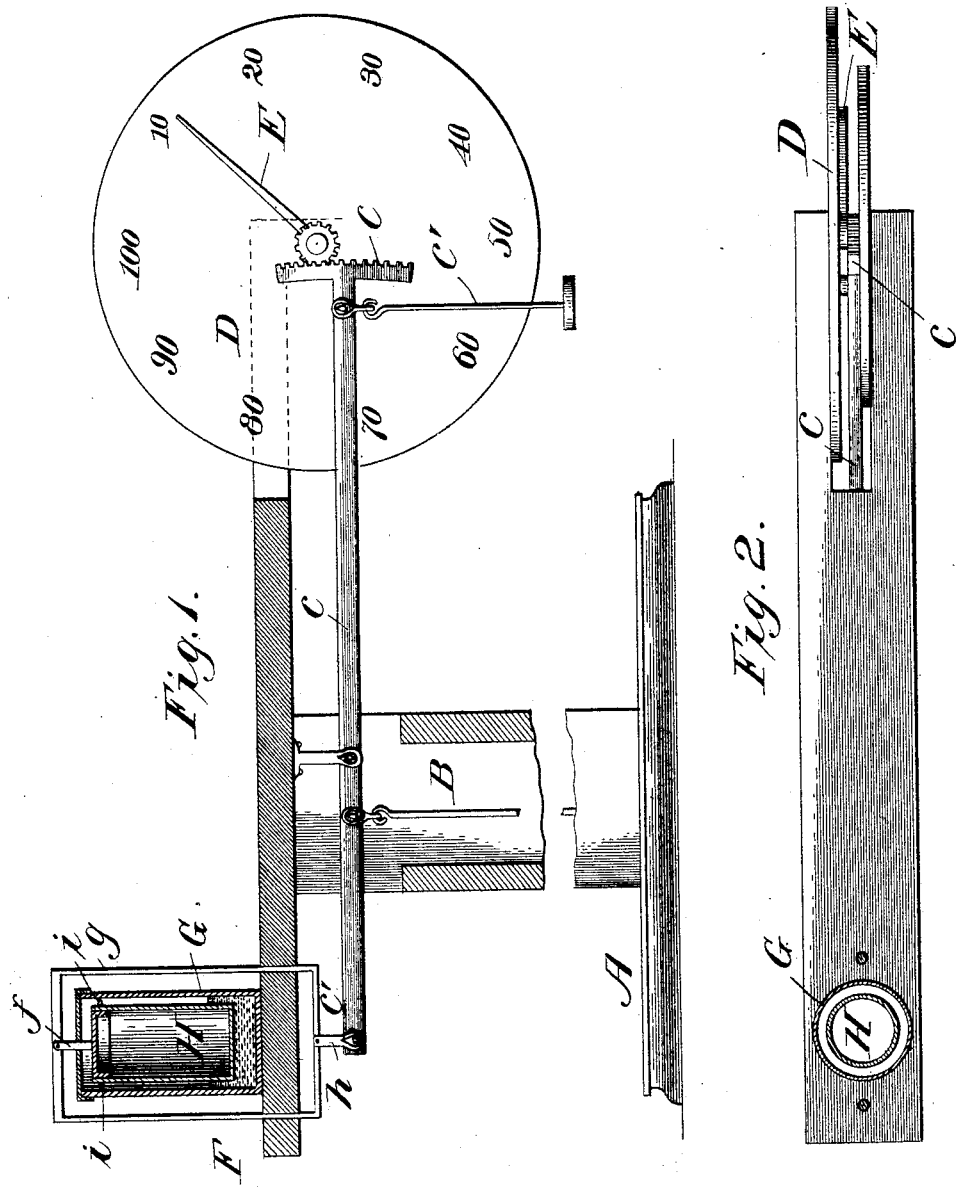
Witnesses
Edwin L. Bradford
A. F. Randall
Inventor,
M. Wallace Newton.
By
V. D. Stockbridge & Son.
Attorneys.

United States Patent Office.

MIRON WALLACE NEWTON, OF BATTLE CREEK, MICHIGAN.

HYDROSTATIC SCALE.

SPECIFICATION forming part of Letters Patent No. 473,772, dated April 26, 1892.

Application filed May 8, 1891. Serial No. 392,029. (No model.)

*To all whom it may concern:*

Be it known that I, MIRON WALLACE NEWTON, a citizen of the United States, residing at Battle Creek, in the county of Calhoun and State of Michigan, have invented certain new and useful Improvements in Weighing Apparatus; and I do hereby declare that the following is a full, clear, and exact description of the invention, such as will enable others skilled in the art to which it appertains to make and use the same.

My invention relates to improvements in weighing apparatus.

The object of the invention is to produce an accurate weighing apparatus which will automatically and plainly indicate the weight of any object placed upon its platform or carrier when the same is within its range or capacity, and to combine with an ordinary scale-beam a supplemental device for plainly indicating any weight less than a multiple of the maximum capacity of such supplemental device.

The invention consists in the combination of a jar or containing-vessel for liquid having a certain coefficient of expansion whereby the variations in the density of the liquid arising from changes in temperature may be compensated by a corresponding variation in the space between the interior of the containing-vessel and the exterior of the float, so that as the liquid expands and becomes lighter a given movement of the float will cause the liquid to rise higher in the vessel and thus maintain a constant resistance to the movement of said float.

The invention also consists in the combination of a hydrostatic balance, an ordinary balance-beam, and a pointer or indicator.

The invention further consists in the combination of a compensatory hydrostatic balance, an ordinary scale-beam, and an automatic indicator.

In the drawings forming a part of this specification, Figure 1 is a sectional elevation of an ordinary platform weighing-scale. Fig. 2 is a plan of the supporting-beam, the hydrostatic attachment being in section.

A is the platform; B, the supporting-beam; C, the ordinary balance-beam; D, a dial; E, a pointer, and F a hydrostatic attachment. The balance-beam C is provided with a curved rack or toothed segment *c* for operating the pointer E, and with the usual hanger *c'* for supporting a poise or weight. It also has an extension C' for connection with the float of the hydrostatic attachment. The hydrostatic attachment or weight-balance F consists of a vessel G for containing the liquid, made of glass or other material, having a low coefficient of expansion, and a float H, made of iron or suitable material, having a higher coefficient of expansion than that of the vessel, and these are so proportioned to each other and the mercury or other liquid to be used that the resistance to the movement of the float will be constant whatever the temperature within the ordinary limits of the atmosphere. The float is coupled with the balance-beam by means of the link *f*, yoke *g*, and loop *h*. Pins or knobs *i i* project from the float to prevent jamming and friction between the float and the vessel. The arrangement of the hydrostatic device above the balance-beam, so as to have a downward pull, serves to keep the float opposite the center of the liquid-containing vessel and thereby avoid friction.

My invention embraces in a single apparatus accurate and convenient means for indicating any predetermined weight as well as any multiple and fraction thereof. According to the dial adopted the hydrostatic device is intended to balance any weight from zero to one hundred units. When a greater weight is to be measured a poise, which will balance some multiple of the one hundred units will be adjusted on the hanger *c'*.

Having now described my invention, what I claim is—

1. In a weighing apparatus, the combination of a hydrostatic counterpoise consisting of a liquid-containing vessel having one coefficient of expansion, a float having a higher coefficient of expansion, and an automatic indicator or pointer, substantially as described.

2. The combination of an automatic compensating hydrostatic counterpoise, an ordinary balance-beam, and an automatic indicator, substantially as described.

In testimony whereof I affix my signature in the presence of two witnesses.

M. WALLACE NEWTON.

Witnesses:
WALTER J. WEBBER,
C. G. HOWELL.